(12) United States Patent
Henderson et al.

(10) Patent No.: US 12,236,429 B2
(45) Date of Patent: Feb. 25, 2025

(54) AUTHORIZATION OF CARDLESS PAYMENT TRANSACTIONS

(71) Applicant: Block, Inc., Oakland, CA (US)

(72) Inventors: William Henderson, Oakland, CA (US); Jack Dorsey, Oakland, CA (US); Brian Grassadonia, Oakland, CA (US); Mathew Wilson, Oakland, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/503,031

(22) Filed: Nov. 6, 2023

(65) Prior Publication Data

US 2024/0144271 A1    May 2, 2024

Related U.S. Application Data

(63) Continuation of application No. 17/547,618, filed on Dec. 10, 2021, now Pat. No. 11,854,010, which is a
(Continued)

(51) Int. Cl.
*G06Q 20/40*    (2012.01)
*G06Q 20/32*    (2012.01)
*G06Q 30/018*    (2023.01)

(52) U.S. Cl.
CPC ..... *G06Q 20/4014* (2013.01); *G06Q 20/3224* (2013.01); *G06Q 20/325* (2013.01);
(Continued)

(58) Field of Classification Search
CPC .. G06Q 40/08; G06Q 30/0232; G05D 1/0088; G07F 17/0021; G08G 1/0112;
(Continued)

(56) References Cited

U.S. PATENT DOCUMENTS 3,854,036 A   12/1974   Gupta et al.
4,035,614 A   7/1977    Frattarola et al.
(Continued)

FOREIGN PATENT DOCUMENTS

CA   2722951 A1   11/2009
CA   2777885 A1   5/2013
(Continued)

OTHER PUBLICATIONS

Chekol, "A survey on next location prediction techniques, applications and challenges", EURASIP Journal on wireless communications and networking, (Year: 2022).*
(Continued)

*Primary Examiner* — Frantzy Poinvil
(74) *Attorney, Agent, or Firm* — Polsinelli PC

(57) ABSTRACT

A method of processing a transaction between a customer and a merchant includes receiving from a mobile device of the customer or from another device of the customer an indication of consent to perform a cardless payment transaction with the merchant, receiving from the mobile device an indication that the customer is within a predetermined distance of the merchant, after receiving both the indication of consent and the indication that the customer is within the predetermined distance, sending to a computer system of the merchant an indication of the presence of the customer and personal identifying information for the customer, receiving data indicating a transaction between the customer and the merchant, and submitting the transaction to a financial service for authorization.

20 Claims, 7 Drawing Sheets

Related U.S. Application Data continuation of application No. 16/788,195, filed on Feb. 11, 2020, now Pat. No. 11,238,451, which is a continuation of application No. 15/408,300, filed on Jan. 17, 2017, now Pat. No. 10,592,903, which is a continuation of application No. 14/017,940, filed on Sep. 4, 2013, now Pat. No. 9,576,289, which is a continuation of application No. 13/683,841, filed on Nov. 21, 2012, now Pat. No. 10,185,958.

(60) Provisional application No. 61/563,022, filed on Nov. 22, 2011.

(52) U.S. Cl.
CPC ....... *G06Q 20/327* (2013.01); *G06Q 20/4012* (2013.01); *G06Q 30/0185* (2013.01)

(58) Field of Classification Search
CPC ........ G08G 1/0129; G08G 1/22; H04L 67/12; H04W 4/70
USPC .................................................. 705/3–44, 72
See application file for complete search history.

(56) References Cited

U.S. PATENT DOCUMENTS

| | | |
|---|---|---|
| 4,254,441 A | 3/1981 | Fisher |
| 4,591,937 A | 5/1986 | Nakarai et al. |
| 4,609,957 A | 9/1986 | Gentet et al. |
| 4,788,420 A | 11/1988 | Chang et al. |
| 5,173,597 A | 12/1992 | Anglin |
| 5,266,789 A | 11/1993 | Anglin et al. |
| 5,434,400 A | 7/1995 | Scherzer |
| 5,589,855 A | 12/1996 | Blumstein et al. |
| 5,679,943 A | 10/1997 | Schultz et al. |
| 5,729,591 A | 3/1998 | Bailey |
| 5,751,373 A | 5/1998 | Ohyama et al. |
| 5,760,773 A | 6/1998 | Berman et al. |
| 6,006,109 A | 12/1999 | Shin |
| 6,021,944 A | 2/2000 | Arakaki |
| 6,032,859 A | 3/2000 | Muehlberger et al. |
| D424,036 S | 5/2000 | Arora et al. |
| 6,061,666 A | 5/2000 | Do et al. |
| 6,173,272 B1 | 1/2001 | Thomas et al. |
| D437,858 S | 2/2001 | Yasui et al. |
| 6,262,724 B1 | 7/2001 | Crow et al. |
| 6,308,227 B1 | 10/2001 | Kumar et al. |
| 6,332,024 B1 | 12/2001 | Inoue et al. |
| 6,341,353 B1 | 1/2002 | Herman et al. |
| D454,356 S | 3/2002 | Hoxie et al. |
| 6,363,139 B1 | 3/2002 | Zurek et al. |
| 6,400,517 B1 | 6/2002 | Murao |
| 6,405,176 B1 | 6/2002 | Toohey |
| 6,431,445 B1 | 8/2002 | DeLand et al. |
| 6,476,743 B1 | 11/2002 | Brown et al. |
| 6,497,368 B1 | 12/2002 | Friend et al. |
| 6,513,018 B1 | 1/2003 | Culhane |
| 6,646,659 B1 | 11/2003 | Brown et al. |
| 6,839,682 B1 | 1/2005 | Blume et al. |
| 6,847,942 B1 | 1/2005 | Land et al. |
| 6,896,182 B2 | 5/2005 | Sakaguchi |
| 6,898,598 B2 | 5/2005 | Himmel et al. |
| 7,004,382 B2 | 2/2006 | Sandru |
| 7,024,205 B1 | 4/2006 | Hose |
| 7,117,165 B1 | 10/2006 | Adams et al. |
| 7,163,148 B2 | 1/2007 | Durbin et al. |
| D560,680 S | 1/2008 | Armendariz |
| 7,324,958 B2 | 1/2008 | Miyazaki et al. |
| 7,337,133 B1 | 2/2008 | Bezos et al. |
| 7,343,317 B2 | 3/2008 | Jokinen et al. |
| 7,343,335 B1 | 3/2008 | Olliphant |
| 7,343,565 B2 | 3/2008 | Ying et al. |
| 7,383,226 B2 | 6/2008 | Kight et al. |
| 7,407,089 B2 | 8/2008 | Patrick |
| D582,939 S | 12/2008 | Neuhaus |
| 7,502,760 B1 | 3/2009 | Gupta |
| 7,506,812 B2 | 3/2009 | von Mueller et al. |
| 7,520,430 B1 | 4/2009 | Stewart et al. |
| D593,580 S | 6/2009 | Truelove et al. |
| 7,600,673 B2 | 10/2009 | Stoutenburg et al. |
| 7,680,690 B1 | 3/2010 | Catalano |
| 7,703,676 B2 | 4/2010 | Hart et al. |
| D616,897 S | 6/2010 | Chaudhri et al. |
| 7,730,151 B1 | 6/2010 | Fabbri et al. |
| 7,757,953 B2 | 7/2010 | Hart et al. |
| 7,793,834 B2 | 9/2010 | Hachey et al. |
| 7,831,246 B1 | 11/2010 | Smith et al. |
| 7,831,520 B2 | 11/2010 | Mengerink |
| 7,848,765 B2 | 12/2010 | Phillips et al. |
| 7,869,591 B1 | 1/2011 | Nagel et al. |
| 7,970,418 B2 | 6/2011 | Schmidt et al. |
| 8,001,044 B2 | 8/2011 | Davis |
| 8,055,564 B2 | 11/2011 | Wehunt et al. |
| 8,065,080 B2 | 11/2011 | Koch |
| 8,065,190 B2 | 11/2011 | Collas et al. |
| D650,794 S | 12/2011 | Pereira et al. |
| 8,090,656 B2 | 1/2012 | Solomon et al. |
| 8,121,945 B2 | 2/2012 | Rackley, III et al. |
| 8,126,806 B1 | 2/2012 | DiMartino et al. |
| 8,127,983 B1 | 3/2012 | Block et al. |
| 8,135,624 B1 | 3/2012 | Ramalingam et al. |
| 8,160,959 B2 | 4/2012 | Rackley, III et al. |
| 8,200,247 B1 | 6/2012 | Starenky et al. |
| 8,229,458 B2 | 7/2012 | Busch |
| 8,231,055 B2 | 7/2012 | Wen |
| 8,239,286 B2 * | 8/2012 | Davis .................... G06Q 30/06 705/26.7 |
| D669,090 S | 10/2012 | Rosen |
| 8,281,998 B2 | 10/2012 | Tang et al. |
| 8,316,237 B1 | 11/2012 | Felsher et al. |
| 8,341,074 B1 | 12/2012 | Reid |
| 8,376,239 B1 | 2/2013 | Humphrey |
| 8,401,968 B1 | 3/2013 | Schattauer et al. |
| D680,551 S | 4/2013 | Ishii et al. |
| 8,413,901 B2 | 4/2013 | Wen |
| 8,417,377 B2 | 4/2013 | Rothschild |
| 8,459,546 B1 | 6/2013 | Block et al. |
| 8,478,692 B2 | 7/2013 | Carlson et al. |
| 8,485,440 B1 | 7/2013 | Arora et al. |
| 8,489,112 B2 | 7/2013 | Roeding et al. |
| 8,500,010 B1 | 8/2013 | Marcus et al. |
| 8,504,073 B2 | 8/2013 | Svendsen et al. |
| 8,509,734 B1 | 8/2013 | Gupta et al. |
| 8,510,220 B2 | 8/2013 | Rackley, III et al. |
| 8,560,823 B1 | 10/2013 | Aytek et al. |
| 8,571,989 B2 | 10/2013 | Dorsey et al. |
| 8,573,487 B2 | 11/2013 | McKelvey |
| 8,573,489 B2 | 11/2013 | Dorsey et al. |
| 8,584,936 B2 | 11/2013 | Fiebiger et al. |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,635,157 B2 | 1/2014 | Smith et al. |
| 8,635,158 B1 | 1/2014 | Ledder et al. |
| 8,639,629 B1 | 1/2014 | Hoffman |
| 8,640,953 B2 | 2/2014 | Dorsey et al. |
| 8,645,222 B1 | 2/2014 | Tamassia et al. |
| 8,645,366 B1 | 2/2014 | Acharya |
| 8,654,222 B2 | 2/2014 | Kuwazoe |
| 8,655,782 B2 | 2/2014 | Poon et al. |
| 8,659,427 B2 | 2/2014 | Brown et al. |
| 8,660,965 B1 | 2/2014 | Bickerstaff |
| 8,662,389 B2 | 3/2014 | Dorsey et al. |
| 8,678,277 B2 | 3/2014 | Dorsey et al. |
| D702,717 S | 4/2014 | Abratowski et al. |
| 8,695,877 B2 | 4/2014 | Mesaros |
| 8,700,527 B2 | 4/2014 | Dolphin et al. |
| 8,701,996 B2 | 4/2014 | Dorsey et al. |
| 8,701,997 B2 | 4/2014 | Dorsey et al. |
| D705,805 S | 5/2014 | Schweizer |
| D705,807 S | 5/2014 | Tursi |
| D706,796 S | 6/2014 | Talbot |
| D707,704 S | 6/2014 | Capua et al. |

(56) References Cited

U.S. PATENT DOCUMENTS

| | | | |
|---|---|---|---|
| 8,751,380 | B2 | 6/2014 | Harvey et al. |
| 8,756,187 | B2 | 6/2014 | Wilson et al. |
| 8,763,900 | B2 | 7/2014 | Marcus et al. |
| D710,866 | S | 8/2014 | Safa |
| 8,794,517 | B1 | 8/2014 | Templeton et al. |
| D714,332 | S | 9/2014 | Jung et al. |
| D714,822 | S | 10/2014 | Capua et al. |
| D717,328 | S | 11/2014 | Lin |
| 8,886,569 | B2 | 11/2014 | Patel et al. |
| 8,892,249 | B2 | 11/2014 | Holman et al. |
| 8,898,288 | B2 | 11/2014 | Peterson |
| 8,918,355 | B2 | 12/2014 | Perrier et al. |
| 8,965,798 | B1 | 2/2015 | Mackrell et al. |
| 8,972,297 | B2 | 3/2015 | Kay et al. |
| D732,059 | S | 6/2015 | Andersen et al. |
| 9,058,604 | B2 | 6/2015 | Carr et al. |
| 9,107,064 | B1 | 8/2015 | Ramalingam et al. |
| 9,218,633 | B2 | 12/2015 | Hulett et al. |
| 9,334,150 | B1 | 5/2016 | Ost et al. |
| 9,424,603 | B2 * | 8/2016 | Hammad ............ G06Q 20/3224 |
| 9,436,955 | B2 | 9/2016 | Dorsey et al. |
| 9,576,289 | B2 | 2/2017 | Henderson et al. |
| 9,589,269 | B2 | 3/2017 | Henderson et al. |
| 9,589,290 | B1 | 3/2017 | Hipschman et al. |
| 9,619,797 | B2 | 4/2017 | Dorsey et al. |
| 9,633,352 | B2 | 4/2017 | Henderson et al. |
| 9,659,310 | B1 | 5/2017 | Allen et al. |
| 9,779,446 | B1 | 10/2017 | Hipschman et al. |
| 9,799,034 | B1 | 10/2017 | Varma et al. |
| 9,824,393 | B2 | 11/2017 | Joseph |
| 9,830,606 | B2 | 11/2017 | Boncimino |
| 9,959,529 | B1 | 5/2018 | Varma et al. |
| 10,026,083 | B1 | 7/2018 | Varma et al. |
| 10,068,272 | B1 | 9/2018 | Varma et al. |
| 10,169,749 | B2 | 1/2019 | Narayana et al. |
| 10,185,958 | B2 | 1/2019 | Henderson et al. |
| 10,242,351 | B1 | 3/2019 | Wilson et al. |
| 10,319,013 | B2 | 6/2019 | Moring et al. |
| 10,402,798 | B1 | 9/2019 | Varma et al. |
| 10,475,029 | B2 * | 11/2019 | Acuña-Rohter ... G06Q 20/4016 |
| 10,579,981 | B2 | 3/2020 | Andrews et al. |
| 10,592,903 | B2 | 3/2020 | Henderson et al. |
| 10,853,855 | B2 | 12/2020 | John et al. |
| 11,023,957 | B1 * | 6/2021 | Montague ............. H04W 4/023 |
| 11,238,451 | B1 | 2/2022 | Henderson et al. |
| 11,423,375 | B2 | 8/2022 | Iyer et al. |
| 11,551,200 | B1 | 1/2023 | Cook et al. |
| 11,645,651 | B2 | 5/2023 | Varma et al. |
| 11,783,331 | B2 | 10/2023 | Varma et al. |
| 11,854,010 | B2 | 12/2023 | Henderson et al. |
| 11,995,624 | B2 * | 5/2024 | Tsou ...................... G06Q 20/12 |
| 2002/0002507 | A1 | 1/2002 | Hatakeyama |
| 2002/0030871 | A1 | 3/2002 | Anderson et al. |
| 2002/0059147 | A1 | 5/2002 | Ogasawara |
| 2002/0065728 | A1 | 5/2002 | Ogasawara |
| 2002/0077974 | A1 | 6/2002 | Ortiz |
| 2002/0116331 | A1 | 8/2002 | Cataline et al. |
| 2002/0161630 | A1 | 10/2002 | Kern et al. |
| 2002/0165462 | A1 | 11/2002 | Westbrook et al. |
| 2002/0174010 | A1 | 11/2002 | Rice |
| 2002/0179704 | A1 | 12/2002 | Deaton |
| 2002/0181710 | A1 | 12/2002 | Adam et al. |
| 2003/0028483 | A1 | 2/2003 | Sanders et al. |
| 2003/0037001 | A1 | 2/2003 | Richardson |
| 2003/0061109 | A1 | 3/2003 | Banerjee et al. |
| 2003/0069780 | A1 | 4/2003 | Hailwood et al. |
| 2003/0089772 | A1 | 5/2003 | Chien |
| 2003/0126016 | A1 | 7/2003 | Asano |
| 2003/0132300 | A1 | 7/2003 | Dilday et al. |
| 2003/0144040 | A1 | 7/2003 | Liu et al. |
| 2003/0204447 | A1 | 10/2003 | Dalzell et al. |
| 2004/0012875 | A1 | 1/2004 | Wood |
| 2004/0033726 | A1 | 2/2004 | Kao |
| 2004/0041911 | A1 | 3/2004 | Odagiri et al. |
| 2004/0044616 | A1 | 3/2004 | Salter |
| 2004/0058705 | A1 | 3/2004 | Morgan et al. |
| 2004/0093281 | A1 | 5/2004 | Silverstein et al. |
| 2004/0093496 | A1 | 5/2004 | Colnot |
| 2004/0104268 | A1 | 6/2004 | Bailey |
| 2004/0127256 | A1 | 7/2004 | Goldthwaite et al. |
| 2004/0128256 | A1 | 7/2004 | Krouse et al. |
| 2004/0151026 | A1 | 8/2004 | Naso et al. |
| 2004/0204074 | A1 | 10/2004 | Desai |
| 2004/0236696 | A1 | 11/2004 | Aoki et al. |
| 2004/0249497 | A1 | 12/2004 | Saigh et al. |
| 2005/0077870 | A1 | 4/2005 | Ha et al. |
| 2005/0156037 | A1 | 7/2005 | Wurzburg |
| 2005/0156038 | A1 | 7/2005 | Wurzburg et al. |
| 2005/0165684 | A1 | 7/2005 | Jensen et al. |
| 2005/0194452 | A1 | 9/2005 | Nordentoft et al. |
| 2005/0236480 | A1 | 10/2005 | Vrotsos et al. |
| 2005/0242173 | A1 | 11/2005 | Suzuki |
| 2005/0247787 | A1 | 11/2005 | Von Mueller et al. |
| 2005/0271199 | A1 | 12/2005 | Collins |
| 2006/0000917 | A1 | 1/2006 | Kim et al. |
| 2006/0064380 | A1 | 3/2006 | Zukerman |
| 2006/0094481 | A1 | 5/2006 | Gullickson |
| 2006/0106716 | A1 | 5/2006 | Hurwitz et al. |
| 2006/0112006 | A1 | 5/2006 | Hurwitz et al. |
| 2006/0112007 | A1 | 5/2006 | Hurwitz et al. |
| 2006/0122902 | A1 | 6/2006 | Petrov et al. |
| 2006/0129484 | A1 | 6/2006 | Hurwitz et al. |
| 2006/0138219 | A1 | 6/2006 | Brzezniak et al. |
| 2006/0143073 | A1 | 6/2006 | Engel et al. |
| 2006/0146839 | A1 | 7/2006 | Hurwitz et al. |
| 2006/0148520 | A1 | 7/2006 | Baker et al. |
| 2006/0152276 | A1 | 7/2006 | Barksdale |
| 2006/0200305 | A1 | 9/2006 | Sheha et al. |
| 2006/0208066 | A1 | 9/2006 | Finn et al. |
| 2006/0223580 | A1 | 10/2006 | Antonio et al. |
| 2006/0234771 | A1 | 10/2006 | Shavrov |
| 2006/0259358 | A1 | 11/2006 | Robinson et al. |
| 2006/0273158 | A1 | 12/2006 | Suzuki |
| 2006/0288367 | A1 | 12/2006 | Swix et al. |
| 2007/0063048 | A1 | 3/2007 | Havens et al. |
| 2007/0067833 | A1 | 3/2007 | Colnot |
| 2007/0078760 | A1 | 4/2007 | Conary et al. |
| 2007/0078771 | A1 | 4/2007 | Allin et al. |
| 2007/0088624 | A1 | 4/2007 | Vaughn et al. |
| 2007/0094065 | A1 | 4/2007 | Wu et al. |
| 2007/0100651 | A1 | 5/2007 | Ramer et al. |
| 2007/0106558 | A1 | 5/2007 | Mitchell et al. |
| 2007/0118449 | A1 | 5/2007 | De La Motte |
| 2007/0136162 | A1 | 6/2007 | Thibodeau et al. |
| 2007/0150375 | A1 | 6/2007 | Yang |
| 2007/0155430 | A1 | 7/2007 | Cheon et al. |
| 2007/0198382 | A1 | 8/2007 | Ferrari |
| 2007/0203801 | A1 | 8/2007 | Istfan |
| 2007/0214237 | A1 | 9/2007 | Stibel et al. |
| 2007/0221728 | A1 | 9/2007 | Ferro et al. |
| 2007/0233615 | A1 | 10/2007 | Tumminaro |
| 2007/0244811 | A1 | 10/2007 | Tumminaro |
| 2007/0250623 | A1 | 10/2007 | Hickey et al. |
| 2007/0255620 | A1 | 11/2007 | Tumminaro et al. |
| 2007/0255653 | A1 | 11/2007 | Tumminaro et al. |
| 2007/0281689 | A1 | 12/2007 | Altman et al. |
| 2008/0004989 | A1 | 1/2008 | Yi |
| 2008/0027815 | A1 | 1/2008 | Johnson et al. |
| 2008/0040274 | A1 | 2/2008 | Uzo |
| 2008/0059370 | A1 | 3/2008 | Sada et al. |
| 2008/0059375 | A1 | 3/2008 | Abifaker |
| 2008/0103972 | A1 | 5/2008 | Lane |
| 2008/0104199 | A1 | 5/2008 | Kalaboukis |
| 2008/0154781 | A1 | 6/2008 | Kumar |
| 2008/0167980 | A1 | 7/2008 | Aaron et al. |
| 2008/0172733 | A1 | 7/2008 | Coriaty et al. |
| 2008/0177662 | A1 | 7/2008 | Smith et al. |
| 2008/0183619 | A1 | 7/2008 | Gould et al. |
| 2008/0195510 | A1 | 8/2008 | Olliphant |
| 2008/0201769 | A1 | 8/2008 | Finn |
| 2008/0208762 | A1 | 8/2008 | Arthur et al. |
| 2008/0238610 | A1 | 10/2008 | Rosenberg |
| 2008/0249938 | A1 | 10/2008 | Drake-Stoker |
| 2008/0275779 | A1 | 11/2008 | Lakshminarayanan |

(56) References Cited

U.S. PATENT DOCUMENTS

| | | |
|---|---|---|
| 2008/0294751 A1 | 11/2008 | Dreiling |
| 2008/0320036 A1 | 12/2008 | Winter |
| 2009/0005987 A1 | 1/2009 | Vengroff et al. |
| 2009/0006151 A1 | 1/2009 | Zarghami et al. |
| 2009/0006156 A1 | 1/2009 | Hunt et al. |
| 2009/0006398 A1 | 1/2009 | Lam et al. |
| 2009/0024533 A1 | 1/2009 | Fernandes et al. |
| 2009/0048890 A1 | 2/2009 | Burgh |
| 2009/0063312 A1 | 3/2009 | Hurst |
| 2009/0068982 A1 | 3/2009 | Chen et al. |
| 2009/0098908 A1 | 4/2009 | Silverbrook et al. |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0144161 A1 | 6/2009 | Fisher |
| 2009/0158212 A1 | 6/2009 | Dykstra-Erickson et al. |
| 2009/0159681 A1 | 6/2009 | Mullen et al. |
| 2009/0177581 A1 | 7/2009 | Garcia et al. |
| 2009/0187492 A1 | 7/2009 | Hammad et al. |
| 2009/0194584 A1 | 8/2009 | Alexander et al. |
| 2009/0204492 A1 | 8/2009 | Scifo et al. |
| 2009/0313165 A1 | 12/2009 | Walter |
| 2010/0010906 A1 | 1/2010 | Grecia |
| 2010/0030578 A1 | 2/2010 | Siddique et al. |
| 2010/0063889 A1 | 3/2010 | Proctor et al. |
| 2010/0063893 A1 | 3/2010 | Townsend |
| 2010/0070378 A1 | 3/2010 | Trotman et al. |
| 2010/0076853 A1 | 3/2010 | Schwarz |
| 2010/0114654 A1 | 5/2010 | Lukose et al. |
| 2010/0121726 A1 | 5/2010 | Coulter et al. |
| 2010/0138341 A1 | 6/2010 | Solomon et al. |
| 2010/0174596 A1 | 7/2010 | Gilman et al. |
| 2010/0182341 A1 | 7/2010 | Lee et al. |
| 2010/0184416 A1 | 7/2010 | Gupta et al. |
| 2010/0184479 A1 | 7/2010 | Griffin |
| 2010/0191629 A1 | 7/2010 | Olliphant |
| 2010/0191653 A1 | 7/2010 | Johnson et al. |
| 2010/0208876 A1 | 8/2010 | Tsuei |
| 2010/0211445 A1 | 8/2010 | Bodington |
| 2010/0216396 A1 | 8/2010 | Fernandez et al. |
| 2010/0222000 A1 | 9/2010 | Sauer et al. |
| 2010/0243732 A1 | 9/2010 | Wallner |
| 2010/0250410 A1 | 9/2010 | Song et al. |
| 2010/0274597 A1 | 10/2010 | Dill |
| 2010/0312385 A1 | 12/2010 | Deuber |
| 2010/0312636 A1 | 12/2010 | Coulter et al. |
| 2010/0332339 A1 | 12/2010 | Patel et al. |
| 2011/0022472 A1 | 1/2011 | Zon |
| 2011/0040624 A1 | 2/2011 | Jhanji |
| 2011/0053560 A1 | 3/2011 | Jain et al. |
| 2011/0076992 A1 | 3/2011 | Chou et al. |
| 2011/0078073 A1 | 3/2011 | Annappindi |
| 2011/0084131 A1 | 4/2011 | McKelvey |
| 2011/0084139 A1 | 4/2011 | McKelvey et al. |
| 2011/0084147 A1 | 4/2011 | Wilson et al. |
| 2011/0106698 A1 | 5/2011 | Isaacson et al. |
| 2011/0113360 A1 | 5/2011 | Johnson et al. |
| 2011/0125566 A1 | 5/2011 | Mclaughlin et al. |
| 2011/0137803 A1 | 6/2011 | Willins |
| 2011/0137804 A1 | 6/2011 | Peterson |
| 2011/0161235 A1 | 6/2011 | Beenau et al. |
| 2011/0172004 A1 | 7/2011 | Breitenbach et al. |
| 2011/0173041 A1 | 7/2011 | Breitenbach et al. |
| 2011/0173092 A1 | 7/2011 | Werbitt |
| 2011/0174879 A1 | 7/2011 | Morley |
| 2011/0178883 A1 | 7/2011 | Granbery et al. |
| 2011/0180601 A1 | 7/2011 | Morley |
| 2011/0184837 A1 | 7/2011 | Biro |
| 2011/0191196 A1 | 8/2011 | Orr et al. |
| 2011/0198395 A1 | 8/2011 | Chen |
| 2011/0201317 A1 | 8/2011 | Karandikar et al. |
| 2011/0202463 A1 | 8/2011 | Powell |
| 2011/0238474 A1 | 9/2011 | Carr et al. |
| 2011/0238514 A1 | 9/2011 | Ramalingam et al. |
| 2011/0256881 A1 | 10/2011 | Huang et al. |
| 2011/0258120 A1 | 10/2011 | Weiss |
| 2011/0259957 A1 | 10/2011 | Tsai |
| 2011/0260860 A1 | 10/2011 | Gupta |
| 2011/0276419 A1 | 11/2011 | Johnson et al. |
| 2011/0313867 A9 | 12/2011 | Silver |
| 2012/0005039 A1 | 1/2012 | Dorsey et al. |
| 2012/0008851 A1 | 1/2012 | Pennock et al. |
| 2012/0011071 A1 | 1/2012 | Pennock et al. |
| 2012/0012653 A1 | 1/2012 | Johnson et al. |
| 2012/0016794 A1 | 1/2012 | Orr et al. |
| 2012/0024607 A1 | 2/2012 | Swope et al. |
| 2012/0030091 A1 | 2/2012 | Hu et al. |
| 2012/0052910 A1 | 3/2012 | Mu et al. |
| 2012/0054100 A1 | 3/2012 | Pfohl |
| 2012/0062599 A1 | 3/2012 | Machida |
| 2012/0072350 A1 | 3/2012 | Goldthwaite et al. |
| 2012/0078673 A1 | 3/2012 | Koke et al. |
| 2012/0095869 A1 | 4/2012 | McKelvey |
| 2012/0095871 A1 | 4/2012 | Dorsey et al. |
| 2012/0095907 A1 | 4/2012 | Dorsey et al. |
| 2012/0097739 A1 | 4/2012 | Babu et al. |
| 2012/0118956 A1 | 5/2012 | Lamba et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0127490 A1 | 5/2012 | Ogasawara et al. |
| 2012/0130903 A1 | 5/2012 | Dorsey et al. |
| 2012/0132712 A1 | 5/2012 | Babu et al. |
| 2012/0136754 A1 | 5/2012 | Underwood |
| 2012/0138683 A1 | 6/2012 | Sather et al. |
| 2012/0143753 A1 | 6/2012 | Gonzalez et al. |
| 2012/0143761 A1 | 6/2012 | Doran et al. |
| 2012/0144329 A1 | 6/2012 | Sasaki |
| 2012/0156337 A1 | 6/2012 | Studor et al. |
| 2012/0166298 A1 | 6/2012 | Smith et al. |
| 2012/0168505 A1 | 7/2012 | Sather et al. |
| 2012/0173349 A1 | 7/2012 | Buckley |
| 2012/0173396 A1 | 7/2012 | Melby et al. |
| 2012/0191522 A1 | 7/2012 | McLaughlin et al. |
| 2012/0209657 A1 | 8/2012 | Connolly |
| 2012/0234918 A1 | 9/2012 | Lindsay |
| 2012/0239417 A1 | 9/2012 | Pourfallah et al. |
| 2012/0259651 A1 | 10/2012 | Mallon et al. |
| 2012/0265364 A1 | 10/2012 | Zambrano |
| 2012/0270528 A1 | 10/2012 | Goodman |
| 2012/0276928 A1 | 11/2012 | Shutter |
| 2012/0284671 A1 | 11/2012 | Bamford et al. |
| 2012/0284769 A1 | 11/2012 | Dixon et al. |
| 2012/0290421 A1 | 11/2012 | Qawami et al. |
| 2012/0290422 A1 | 11/2012 | Bhinder |
| 2012/0295639 A1 | 11/2012 | Fitoussi et al. |
| 2012/0310744 A1 | 12/2012 | Kim et al. |
| 2012/0310824 A1 | 12/2012 | Liberty |
| 2012/0330769 A1 | 12/2012 | Arceo |
| 2013/0003089 A1 | 1/2013 | Morovic et al. |
| 2013/0005433 A1 | 1/2013 | Holch |
| 2013/0006782 A1 | 1/2013 | Schwarzkopf et al. |
| 2013/0006853 A1 | 1/2013 | Amundsen |
| 2013/0024375 A1 | 1/2013 | Choudhuri et al. |
| 2013/0024376 A1 | 1/2013 | Choudhuri et al. |
| 2013/0030890 A1 | 1/2013 | Richardson |
| 2013/0030955 A1 | 1/2013 | David |
| 2013/0031004 A1 | 1/2013 | Dorsey et al. |
| 2013/0035114 A1 | 2/2013 | Holden et al. |
| 2013/0036051 A1 | 2/2013 | Giordano et al. |
| 2013/0040663 A1 | 2/2013 | Gold |
| 2013/0041824 A1 | 2/2013 | Gupta |
| 2013/0050250 A1 | 2/2013 | Brinda et al. |
| 2013/0054330 A1 | 2/2013 | O'Donnell et al. |
| 2013/0059598 A1 | 3/2013 | Miyagi et al. |
| 2013/0085931 A1 | 4/2013 | Runyan |
| 2013/0087614 A1 | 4/2013 | Limtao et al. |

(56) References Cited

U.S. PATENT DOCUMENTS

| | | |
|---|---|---|
| 2013/0110658 A1 | 5/2013 | Lyman et al. |
| 2013/0111412 A1 | 5/2013 | Sura et al. |
| 2013/0151380 A1 | 6/2013 | Holt |
| 2013/0169046 A1 | 7/2013 | Shin et al. |
| 2013/0173464 A1 | 7/2013 | Quillian |
| 2013/0173467 A1 | 7/2013 | Nuzzi et al. |
| 2013/0173470 A1 | 7/2013 | Nuzzi et al. |
| 2013/0178233 A1 | 7/2013 | McCoy et al. |
| 2013/0179330 A1 | 7/2013 | Quillian |
| 2013/0200153 A1 | 8/2013 | Dorsey et al. |
| 2013/0204886 A1 | 8/2013 | Faith et al. |
| 2013/0207481 A1 | 8/2013 | Gobburu et al. |
| 2013/0218991 A1 | 8/2013 | McConnell et al. |
| 2013/0248596 A1 | 9/2013 | Arora et al. |
| 2013/0254117 A1 | 9/2013 | von Mueller et al. |
| 2013/0297321 A1 | 11/2013 | Raux et al. |
| 2013/0311315 A1 | 11/2013 | Zises |
| 2014/0001257 A1 | 1/2014 | Dorsey et al. |
| 2014/0001263 A1 | 1/2014 | Babu et al. |
| 2014/0006184 A1 | 1/2014 | Godsey |
| 2014/0006205 A1 | 1/2014 | Berry et al. |
| 2014/0012806 A1 | 1/2014 | Ching et al. |
| 2014/0015785 A1 | 1/2014 | Sato et al. |
| 2014/0017955 A1 | 1/2014 | Lo et al. |
| 2014/0032341 A1 | 1/2014 | Balasubramanian et al. |
| 2014/0045516 A1 | 2/2014 | Turgman et al. |
| 2014/0047045 A1 | 2/2014 | Baldwin et al. |
| 2014/0052615 A1 | 2/2014 | Andersen |
| 2014/0061301 A1 | 3/2014 | Cho et al. |
| 2014/0074610 A1 | 3/2014 | Bilange |
| 2014/0074743 A1 | 3/2014 | Rademaker |
| 2014/0076964 A1 | 3/2014 | Morley |
| 2014/0097242 A1 | 4/2014 | McKelvey |
| 2014/0108173 A1 | 4/2014 | Cooper et al. |
| 2014/0108177 A1 | 4/2014 | Erke et al. |
| 2014/0123072 A1 | 5/2014 | Bhowmick et al. |
| 2014/0124576 A1 | 5/2014 | Zhou et al. |
| 2014/0143145 A1 | 5/2014 | Kortina et al. |
| 2014/0144983 A1 | 5/2014 | Dorsey et al. |
| 2014/0156508 A1 | 6/2014 | Argue et al. |
| 2014/0156531 A1 | 6/2014 | Poon et al. |
| 2014/0164221 A1 | 6/2014 | Sinton et al. |
| 2014/0172704 A1 | 6/2014 | Atagun et al. |
| 2014/0195454 A1 | 7/2014 | Richie et al. |
| 2014/0203082 A1 | 7/2014 | Huh |
| 2014/0222663 A1 | 8/2014 | Park et al. |
| 2014/0257877 A1 | 9/2014 | L'Heureux et al. |
| 2014/0263630 A1 | 9/2014 | Richardson et al. |
| 2014/0278609 A1 | 9/2014 | Capps |
| 2014/0279098 A1 | 9/2014 | Ham |
| 2014/0279123 A1 | 9/2014 | Harkey et al. |
| 2014/0279185 A1 | 9/2014 | Merz et al. |
| 2014/0289071 A1 | 9/2014 | Fox et al. |
| 2014/0289073 A1 | 9/2014 | Gold |
| 2014/0310182 A1 | 10/2014 | Cummins |
| 2014/0359510 A1 | 12/2014 | Graf et al. |
| 2014/0379578 A1 | 12/2014 | Chan et al. |
| 2014/0379582 A1 | 12/2014 | Caglayan et al. |
| 2015/0031393 A1 | 1/2015 | Post et al. |
| 2015/0039462 A1 | 2/2015 | Shastry et al. |
| 2015/0046339 A1 | 2/2015 | Wong et al. |
| 2015/0081532 A1 | 3/2015 | Lewis et al. |
| 2015/0088997 A1 | 3/2015 | Van Dijk et al. |
| 2015/0100488 A1 | 4/2015 | Dua |
| 2015/0142604 A1 | 5/2015 | Kneen |
| 2015/0149350 A1 | 5/2015 | Ananda Kumar et al. |
| 2015/0178835 A1 | 6/2015 | Quillian |
| 2015/0254648 A1 | 9/2015 | Clements et al. |
| 2015/0254699 A1 | 9/2015 | Bondesen et al. |
| 2015/0262244 A1 | 9/2015 | Rados et al. |
| 2015/0287006 A1 | 10/2015 | Hunter et al. |
| 2015/0304806 A1 | 10/2015 | Vincent |
| 2015/0339648 A1 | 11/2015 | Kushevsky et al. |
| 2015/0347999 A1 | 12/2015 | Lau et al. |
| 2016/0012465 A1 | 1/2016 | Sharp |
| 2016/0125506 A1 | 5/2016 | Carr et al. |
| 2016/0169696 A1 | 6/2016 | Butts et al. |
| 2016/0189158 A1* | 6/2016 | Eramian ............ G06Q 20/4014 705/44 |
| 2016/0210606 A1 | 7/2016 | Henderson et al. |
| 2016/0232515 A1 | 8/2016 | Jhas et al. |
| 2017/0011450 A1 | 1/2017 | Frager et al. |
| 2017/0083902 A1 | 3/2017 | Gilbey et al. |
| 2017/0270573 A1 | 9/2017 | Kim et al. |
| 2018/0350144 A1* | 12/2018 | Rathod ............. G06Q 20/3224 |
| 2019/0295072 A1 | 9/2019 | Jain et al. |
| 2019/0355034 A1 | 11/2019 | Moring et al. |
| 2020/0034823 A1* | 1/2020 | Rollings ............. G06F 16/9537 |
| 2020/0175495 A1 | 6/2020 | Omojola et al. |
| 2020/0175500 A1 | 6/2020 | Omojola et al. |
| 2023/0206233 A1 | 6/2023 | Aument et al. |
| 2023/0267461 A1 | 8/2023 | Varma et al. |

FOREIGN PATENT DOCUMENTS

| | | |
|---|---|---|
| DE | 202012100620 U1 | 8/2012 |
| EP | 2184722 A1 | 5/2010 |
| GB | 201301094 | 3/2013 |
| GB | 2511485 A | 9/2014 |
| JP | 2001-313714 A | 11/2001 |
| JP | 2004-078662 A | 3/2004 |
| JP | 2005-269172 A | 9/2005 |
| KR | 10-0452161 B1 | 10/2004 |
| KR | 10-2005-0077659 A | 8/2005 |
| KR | 10-2008-0039330 A | 5/2008 |
| WO | 2001/065827 A2 | 9/2001 |
| WO | 2010/097711 A2 | 9/2010 |
| WO | 2010/135174 A1 | 11/2010 |
| WO | 2013/116806 A1 | 8/2013 |
| WO | 2014/032047 A1 | 2/2014 |
| WO | 2015/066056 A1 | 5/2015 |
| WO | 2016/094500 A2 | 6/2016 |

OTHER PUBLICATIONS

Kuang, et al, "Using location semantics to realize personalized road network location privacy protection", EURASIP Journal on Wireless Communications and Networking (Year: 2020).*

"First Data and PayPal Team up to Offer New Online Payment Services for STAR[R] Network Cardholders", Business Wire, 3 pages Oct. 8, 2009.

"Payments: Chasing The Bugs Out of Invoicing: JPMorgan Chase and Banamex are among the offering new cards to business customers to improve automated billing and payment accuracy", Bank Technology News, vol. 20, Issue 7, 3 pages, Jul. 2007.

Adractas et al., "The road to mobile payments services", McKinsey on Payments, pp. 45-52, Sep. 2011.

Barnes S., "Location-Based Services", Victoria University of Wellington, 2003, 14 pages.

Caroline L., "The 3 best credit cards for adding someone as an authorized user—so they can build credit and get benefits like airport lounge access", Business Insider, US edition [New York] Feb. 4, 2020.

Chakravorti et al., "Underlying in credit card networks", Antitrust Bulletin vol. 48, issue 1, pp. 53-75, Sage Publications Ltd., Spring 2003.

Justin, "Visa Enters The Location-Based Mobile Marketing Space With New iPhone App", Dec. 14, 2010, 4 pages.

Rustamov T., "Payments papers, Directions in the development of the payment service market", Central Bank of the Republic of Azerbaijan, Payment Systems and Settlements Department, Mar. 17, 2016, 14 pages.

"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1.

Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.

(56) References Cited

OTHER PUBLICATIONS

Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.

Nagasubramanian, R. and Rajagopalan, S.P., "Online Payment—Innovation in Split Tender Payment", International Journal of Computer Applications, vol. 55, No. 10, pp. 35-41 (Oct. 2012).

\* cited by examiner

AUTHORIZATION OF CARDLESS PAYMENT TRANSACTIONS

CROSS-REFERENCE TO RELATED APPLICATIONS

This application is a continuation of U.S. patent application Ser. No. 17/547,618, filed Dec. 10, 2021, which is a continuation of U.S. patent application Ser. No. 16/788,195, filed Feb. 11, 2020, now U.S. Pat. No. 11,238,451, which is a continuation of U.S. patent application Ser. No. 15/408,300, filed Jan. 17, 2017, now U.S. Pat. No. 10,592,903, which is a continuation of U.S. patent application Ser. No. 14/017,940, filed Sep. 4, 2013, now U.S. Pat. No. 9,576,289, which is a continuation of U.S. patent application Ser. No. 13/683,841, filed Nov. 21, 2012, now U.S. Pat. No. 10,185,958, which claims the benefit under 35 U.S.C. § 119(e) of U.S. Provisional Patent Application No. 61/563,022, filed Nov. 22, 2011, the full disclosures of which are expressly incorporated herein by reference in their entireties.

TECHNICAL FIELD

This disclosure relates to cardless payment transactions.

BACKGROUND

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

Many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN).

Another conventional purchasing technique is online shopping, e.g., using a web browser to view a merchant's web page. However, online shopping is generally not applicable if the customer is present in person at the merchant's store.

SUMMARY

On the one hand, it would be generally convenient for a customer to dispense with swiping of a credit card. On the other hand, the risk of unauthorized transactions is a potential problem in cardless payment transaction. An approach for conducting an electronic payment transaction without swiping a card is for the customer to provide authorization that particular merchants can perform a cardless payment transaction, and for such transactions to only be authorized when the customer is within a predetermined distance of the merchant, e.g., as sensed by the customer's mobile device.

In one aspect, a method of processing a transaction between a customer and a merchant includes receiving from a mobile device of the customer or from another device of the customer an indication of consent to perform a cardless payment transaction with the merchant, receiving from the mobile device an indication that the customer is within a predetermined distance of the merchant, after receiving both the indication of consent and the indication that the customer is within the predetermined distance, sending to a computer system of the merchant an indication of the presence of the customer and personal identifying information for the customer, receiving data indicating a transaction between the customer and the merchant, and submitting the transaction to a financial service for authorization.

Implementations may include one or more of the following features. An indication may can be received from the financial service that the transaction is authorized. A record of the transaction may be sent to the computer system of the merchant. An indication of consent may be received from the merchant to perform cardless payment transactions with customers, and location information for the merchant may be received. An indication of a request to identify a merchant that will perform cardless payment transactions may be received from the mobile device of the customer. Location information for the customer from the mobile device of the customer may be received, the merchant may be selected from a plurality of merchants based on the location information for the customer and the location information for the merchant, and an identification of the merchant and the location information for the merchant may be sent to the mobile device of the customer. The indication of consent to perform the cardless payment transaction with the merchant is may be received before or after the indication that the customer is within the predetermined distance of the merchant is received. The indication of consent to perform the cardless payment transaction with the merchant may be received in the indication that the customer is within the predetermined distance of the merchant. The personal identifying information may be a name and/or a photograph of the customer.

Whether a value of the transaction exceeds a predetermined amount may be determined, and a request for approval of the transaction may be sent to the mobile device of the customer before submitting the transaction to the financial service. A PIN may be received from the mobile device in response to the request for approval, and the PIN may be compared to a previously received PIN. Whether a value of the transaction exceeds a predetermined amount may be determined, and a request for approval of the transaction by the customer may be sent to the computer system of the merchant before submitting the transaction to the financial service. A PIN may be received from the computer system of the merchant, and the PIN may be compared to a previously received PIN. A value of the transaction may be determined to not exceed a predetermined amount, and the transaction may be submitted to the financial service without sending to the mobile device of the customer a request for approval of the transaction. An identification of the financial institution and the personal information may be received from a mobile device of the customer or from another device of the customer. Data indicating a transaction between the customer may be received from the computer system of the merchant. A record of the transaction may be sent to the user device. The transaction may be submitted to a financial service for capture before sending the record of the transaction.

In another aspect, a method of performing a transaction with a merchant includes receiving in a mobile device a location of a merchant, determining in the mobile device whether the mobile device is within a predetermined distance of the location of the merchant, sending from the mobile device to a computer system of a third party an indication that the customer is within a predetermined distance of the merchant, sending from the mobile device to the computer system of the third party an indication of consent to perform a cardless payment transaction with the merchant, and receiving in the mobile device from the computer system of the third party a record of a transaction with the merchant.

Implementations may include one or more of the following features. The record of the transaction may be received without having transmitted an approval for the amount of the transaction. A request for approval of the transaction may be received in the mobile device, and the request may include the amount of the transaction. A PIN may be sent from the mobile device to the computer system of the third party in response to the request for approval. Location information for a plurality of merchants may be received, input from the customer may be received selecting the merchant from the plurality of merchants, and an identification of the merchant may be sent to the computer system of the third party.

In another aspect, a method of performing a transaction with a customer includes receiving an indication from a computer system of a third party that a customer is present within a predetermined distance and personal identifying information for the customer, displaying an option to perform a cardless payment transaction with the customer and displaying the personal identifying information, receiving user input selecting the option, receiving user input identifying a transaction with the customer including at least an amount of the transaction, sending data indicating the transaction to the computer system of the third party, and receiving from the computer system of the third party a record of a transaction.

Implementations may include one or more of the following features. An amount of the transaction may be determined to exceed a threshold or receiving a request for approval of the transaction, and requesting input from the customer approving the transaction. Requesting input may include requesting a PIN, and the PIN may be sent to the computer system of the third party. Whether the amount of the transaction exceeds the threshold may be determined.

In another aspect, a computer program product, tangibly embodied in a machine readable storage media, includes instructions for causing a processor to perform any of the methods described above.

In another aspect, a system for processing a transaction between a customer and a merchant includes a customer mobile device, a merchant computer system, and a server system. The customer mobile device, merchant computer system and server system are configured to perform an operation in which the mobile device receives customer input indicating consent to perform a cardless payment transaction with the customer and sends to the server system an indication of the consent, the mobile device receives a location of a merchant, determines whether the mobile device is within a predetermined distance of the location of the merchant, and if the mobile device is within the predetermined distance send to the server system an indication that the customer is within the predetermined distance, after receiving both the indication of consent and the indication that the customer is within the predetermined distance, the server system sends to the merchant computer system an indication of the presence of the customer and personal identifying information for the customer, the merchant computer system displays an option to perform a cardless payment transaction with the customer and displays the personal identifying information, receives merchant input identifying a transaction with the customer including at least an amount of the transaction, and sends data indicating the transaction to the server system, the server system submits the transaction to a financial service for authorization, receives an indication from the financial service that the transaction is authorized, and sends a record of the transaction to the mobile device and to the merchant computer system.

Advantages may include one or more of the following. A customer can conduct a point-of-sale electronic payment transaction with a merchant without swiping a card. In addition, the customer can verbally notify the merchant to perform a transaction, and the customer can conduct the transaction without having to access his or her own wallet or mobile phone. In addition, in some implementations the customer need not interact with a point-of-sale device, e.g., need not press an approve button on a user interface of the point-of-sale device or electronically sign. Consent to a cardless payment transaction can be given by the customer before the customer physically arrives at the merchant or at the merchant's point-of-sale device.

BRIEF DESCRIPTION OF THE DRAWINGS

Like reference numbers and designations in the various drawings indicate like elements.

DETAILED DESCRIPTION

As an overview, the system allows a user (also called a customer or payer) to purchase items from a merchant while physically present at the merchant, e.g., at the point of sale, but using a cardless payment transaction. A cardless payment transaction is one where a user conducts the transaction with a merchant at a point of sale using a financial account without physically presenting a payment card to the merchant at the point of sale. In fact, the merchant need not receive any details about the financial account, e.g., the credit card issuer, credit card number, and the like is not provided to the merchant.

From the user's perspective, the user first signs up for an account with the cardless payment system. The sign-up process requires certain information, such as information about a financial account sufficient to perform a transaction with the account. For example, if the financial account is a credit card account, then credit card information can be provided, e.g., credit card number and expiration date. The user can also sign up with other payment methods such as debit cards, pre-paid cards, bank accounts, or other third party financial accounts. The sign up process can also require contact information for the user, e.g., mailing address and email, and other personal identifying information, e.g., a photograph of the user. After creating an account, the user can select a merchant that also has an account with the cardless payment system. The user can give consent to perform a cardless payment transaction with the merchant if the user is within a predetermined distance from the merchant. After the user gives consent, the merchant can, without a presentment of the physical payment card, charge (in the case of credit cards) or debit (in the case of debit cards) the user's financial account for items the user wants to buy. Because the user's payment card is already on file with the cardless payment system, the user does not need to physically present a credit card to the merchant.

Figure 1:
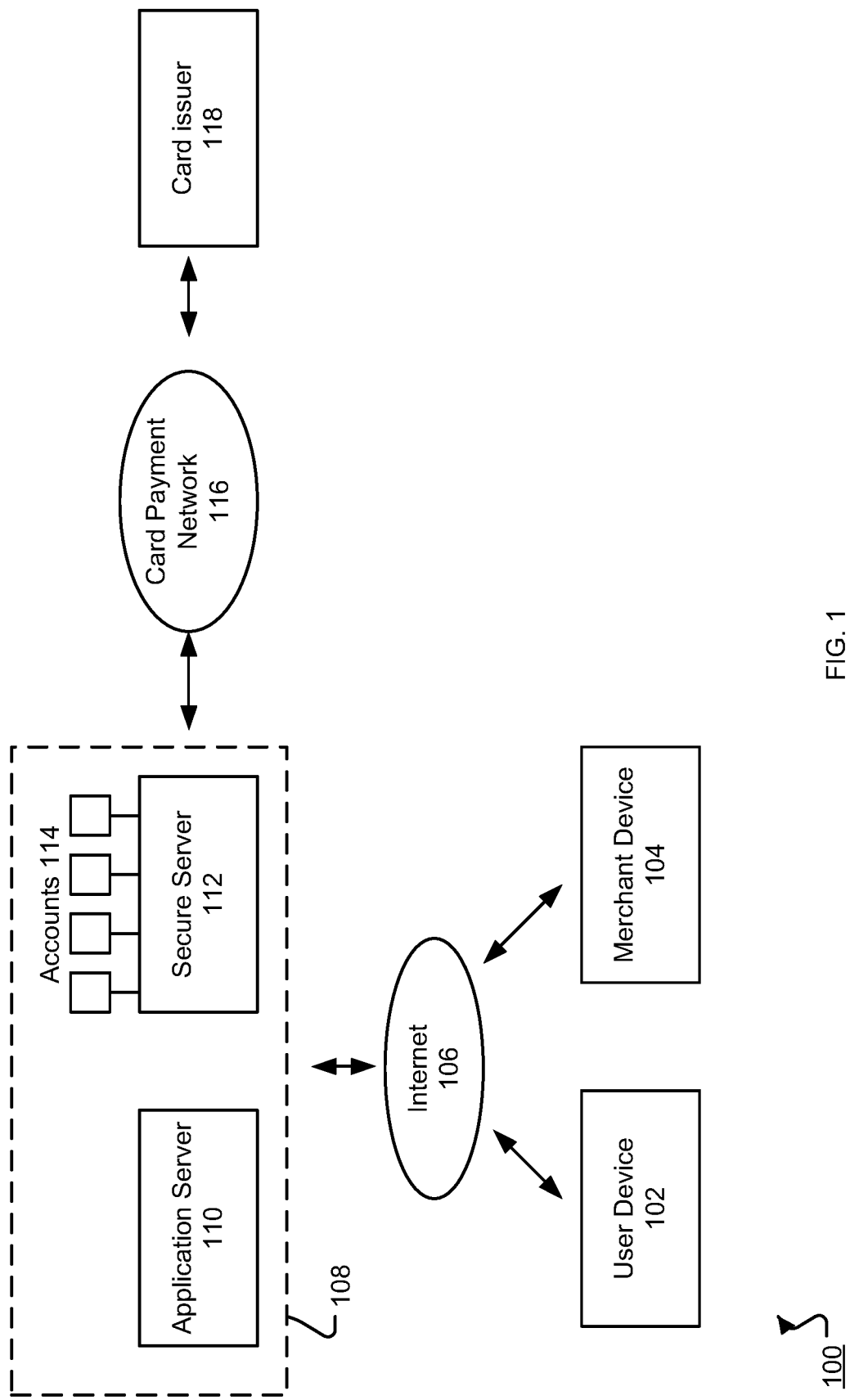
FIG. 1 is a schematic illustration of an example cardless payment system architecture.

FIG. 1 is a schematic illustration of the architecture of an example cardless payment system 100. The overall system 100 includes a user device 102 and merchant device 104 connected to a network, e.g., the Internet 106. The user device 102 is a mobile computing device, i.e., a hand-held computing device, capable of running a user application. For example, the user device 102 can be a smartphone or tablet computer. The merchant device 104 is also a computing device, capable of running a merchant application. The merchant device 104 can be a mobile device, or it can be a desktop computer, a laptop computer, a dedicated point of sale system, or other data processing apparatus.

A cardless payment processor operates a payment service system 108. The user and merchant devices can communicate with the payment service system 108 using the network 106. The payment service system 108 includes an application server 110 and a secure server 112 to processes all transactions between the user device 102 and merchant device 104. In general, the application server 110 handles non-secure information. For example, it can store public merchant information such as the merchant's address or phone number. The application server 110 can also be responsible for transferring or updating the user application to the user's mobile device or transferring or updating the merchant application to the merchant's computing device. In particular, the application server 112 can be responsible for sending information about merchants that have accounts with the cardless payment system to the user device 102. The secure server 112 handles secure information such as credit card numbers, debit card numbers, bank accounts, user accounts, user identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between the user and the merchant can be performed using the cardless payment system, the user must create a user account with the payment service system 108 and the merchant must create a merchant account with the payment service system 108.

The user can sign up using a mobile application or using an online website, and can use the mobile device 102 or another computing device, e.g., a home computer. At some point prior to the transaction, a user application is downloaded to the user device 102, e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the user before a transaction can be performed. The photo of the user would be provided to the merchant so that the merchant can compare the photo to the person. In addition, the payment service system 108 can require a personal identification number (PIN) be entered by the user. Other requirements can also be added to increase security. The data associated with a user account 114 can be stored at the secure server 112, e.g., in a database.

If the user is signing up with a mobile application, the user's financial account information can be entered by swiping the financial transaction card through a slot of a card reader coupled to the mobile device. Alternatively, the user can enter in financial account information by typing in information at the mobile device 102, selecting a card from an application on the mobile device, from an online entity, or others. In some implementations, another external application generates a receipt that is sent to the user. The receipt then includes a hypertext link that allows a user to easily create a user account in the cardless payment system. For example, activating the link in the receipt can automatically create a user account with a payment card prefilled with the card used in the receipt to reduce effort by the user. In effect, activating a new account using a receipt auto-verifies the user into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the secure server 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

Figure 2:
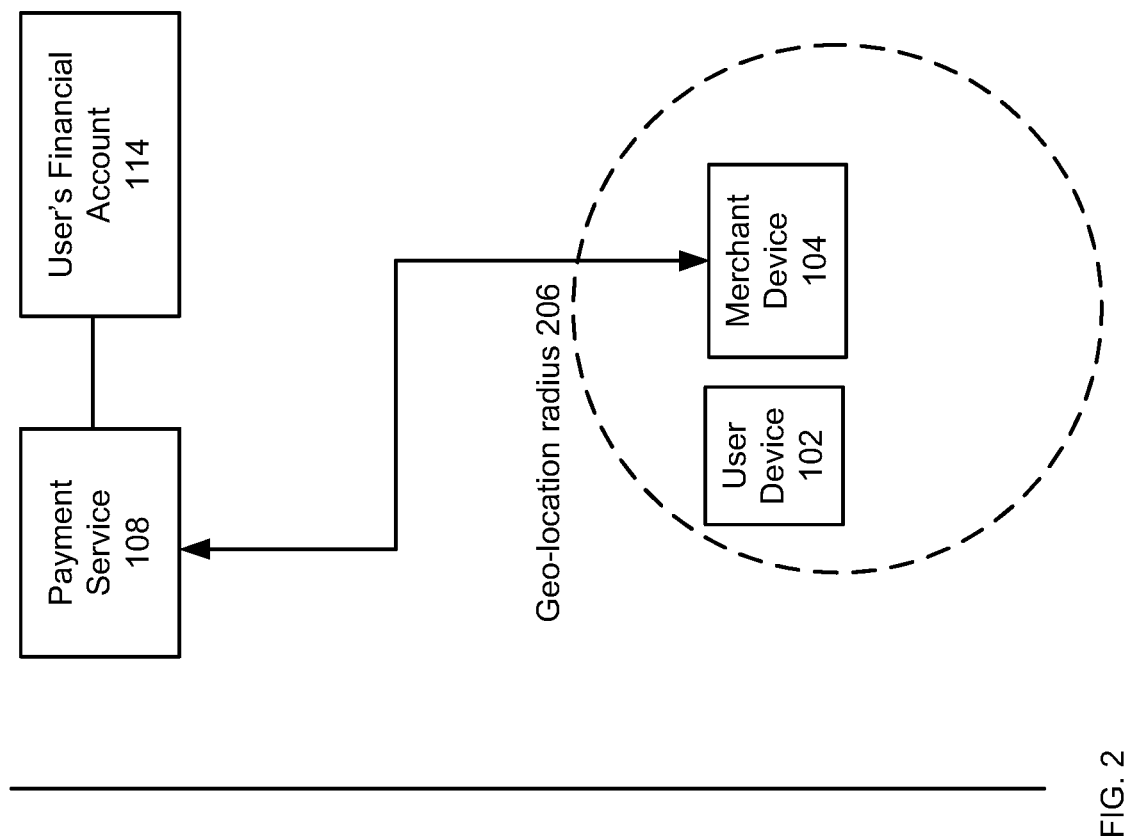
FIG. 2 is a diagram of an example implementation of the cardless payment system.
Figure 2:
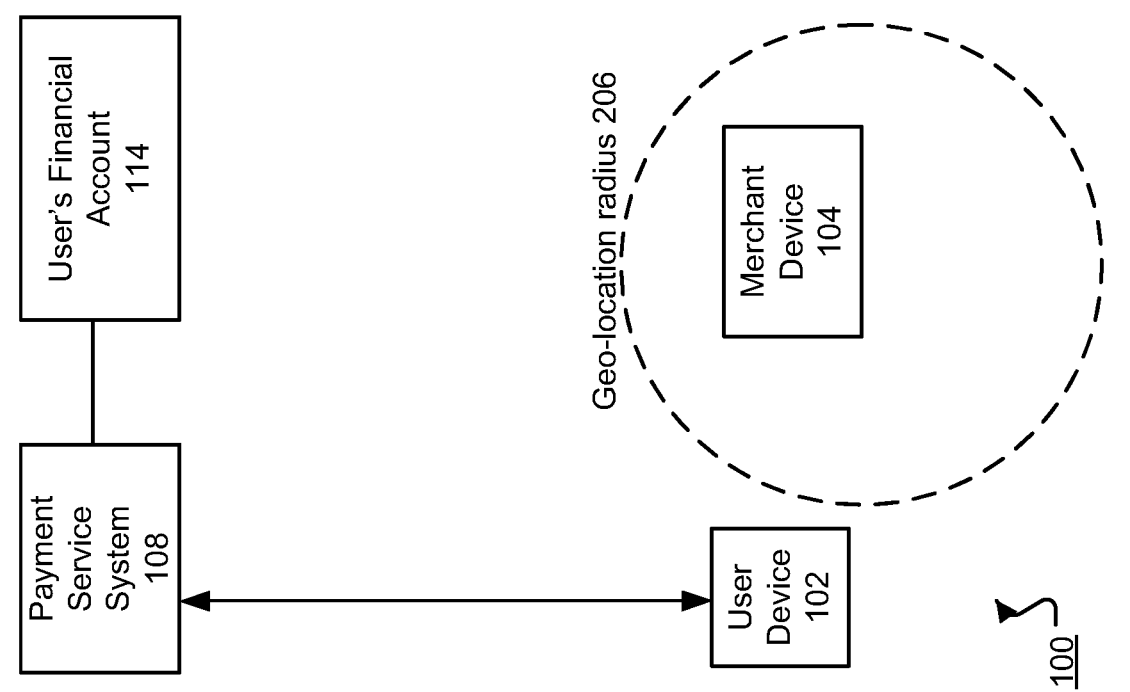

FIG. 2 is a diagram that outlines an example implementation of the cardless payment system 100. A user carries a mobile device 102 with the user application installed, and a merchant has a device 104 with the merchant application installed. Users and merchants each have an association, e.g., an account, with the payment service system 108.

The system can predetermine a geo-location distance 206, e.g., a radius, around the location of the merchant. In some implementations, the geo-location distance 206 is 500 feet. In some implementations, the geo-location distance 206 can be set by the merchant, e.g., the payment service system 108 receives input from the merchant device 104 or another computer system of the merchant setting the location radius. In some implementations, the payment service system 108 may limit the radius set by the merchant to a maximum location radius.

If the user device is located outside the geo-location radius 206 of the merchant, the merchant application does not provide an option to conduct a cardless payment transaction with the user. In this case, the user device 102 will indicate it is outside the geo-location radius 206 of the merchant, and the merchant device 104 will be unable to charge the user's financial account, as further described in FIG. 3 and FIG. 6.

However, a user can create or configure a tab with the merchant at any geographical location using an application on the user device 102, or on another device, e.g., another mobile device or on a home computer, that is granted access to the user's account. A tab is a relationship between the user, the payment service system 108, and the merchant. Once a tab is created, the user device 102 saves the merchant's information, e.g., the name and location of the merchant, and the user device 102 can display information about the merchant a main view of the application as further described in FIG. 4 when the application is active. If the tab is created by the user using a device other than the user device 102, then the payment service system 108 will provide the merchant information to the user device 102.

Figure 3:
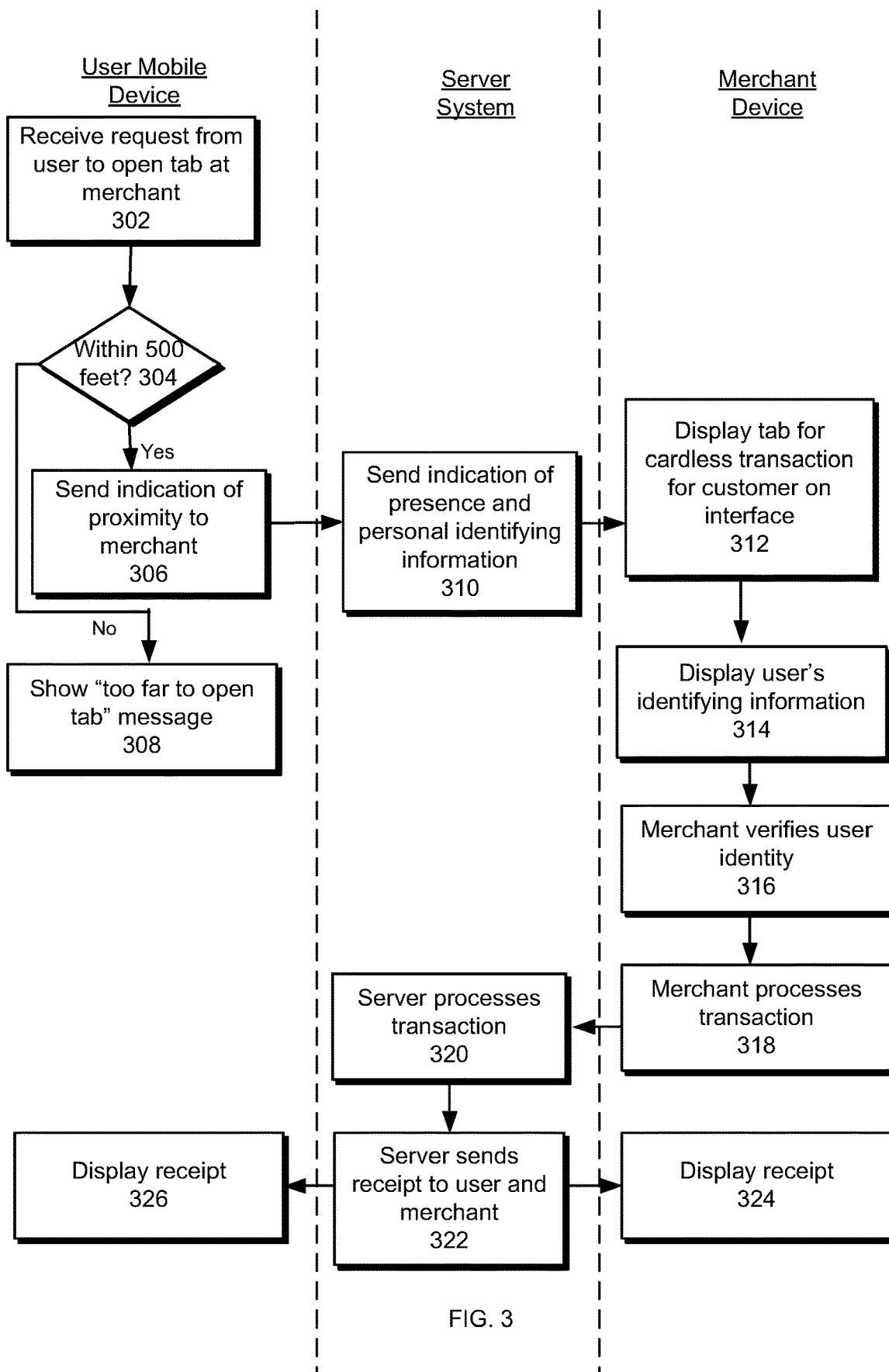
FIG. 3 is a diagram of an example flow chart of the cardless payment system.
Figure 5:
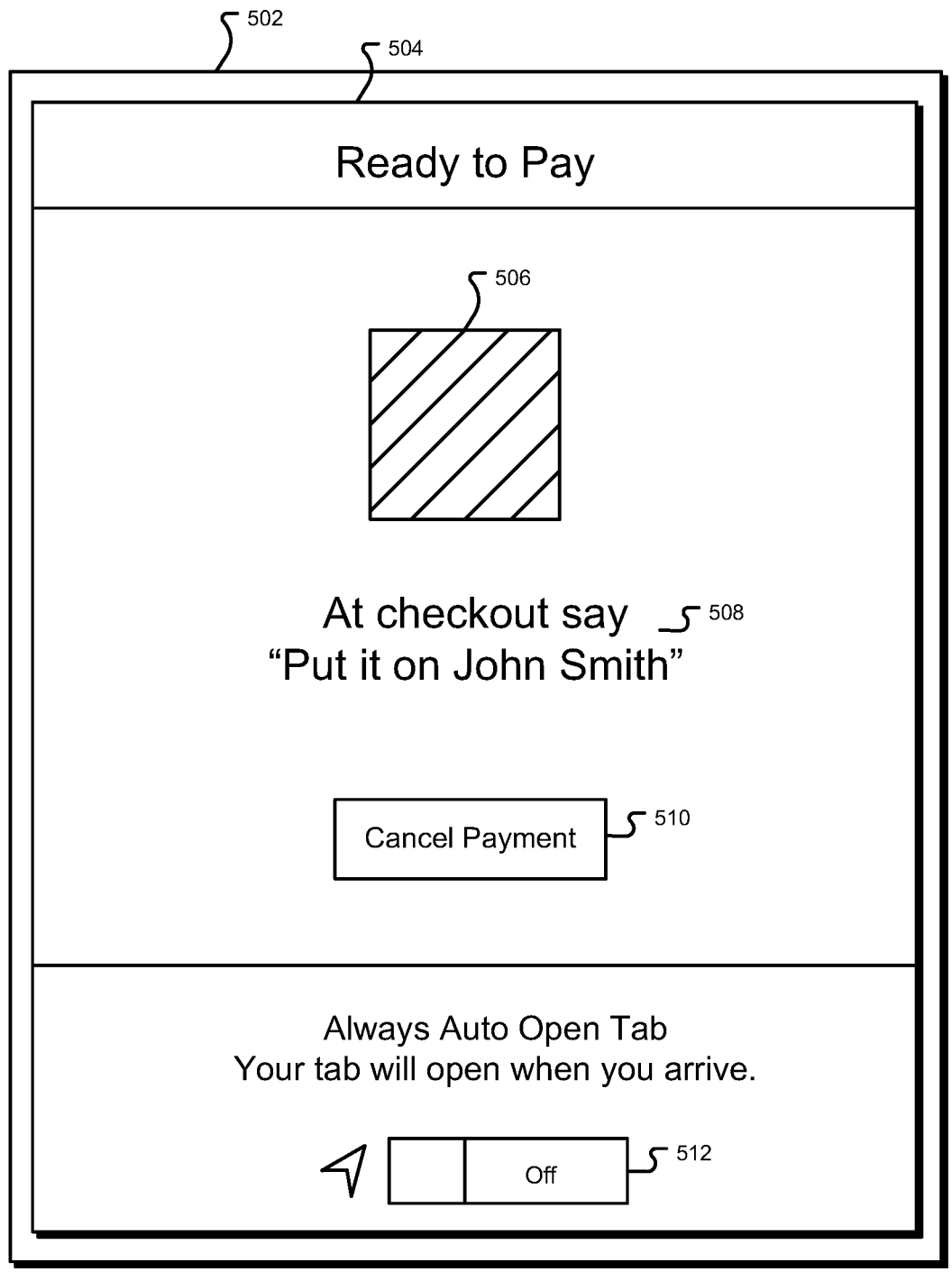
FIG. 5 is a diagram of an example application view of a user that has opened a tab at a merchant inside the predetermined distance from the merchant.

If the user device 102 is located within the geo-location radius 206 of the merchant, the user can "open a tab" with the merchant using an application on the user device 102 as further described in FIG. 3 and FIG. 5. The user can configure the tab to "auto-open" the tab once the user is within the geo-location radius 206 of the merchant, which will be further described below. In some implementations, the user can configure a tab to set a maximum amount that can be charged per transaction with the merchant.

Opening a tab with a merchant allows the merchant application to display an option to charge the user's financial account using a cardless payment transaction. In essence, opening the tab constitutes a consent by the user to conducting a cardless transaction with the merchant. This consent differs from actual authorization of the transaction, which the user would provide, e.g., verbally, upon learning the amount of the transaction.

In some implementations, in order to determine whether user device 102 is within the geo-location radius 206 of the merchant device 104, the merchant's location, e.g., address, and the geo-location radius 206 for the merchant are provided to the user device 102. The user device 102 can then use a geofencing function. For example, the user device 102 determines its own location, e.g., based on GPS information, cellphone data, wireless network data, or the like, and then determines whether its own location is within the geo-location radius 206 of the merchant location.

FIG. 3 is a diagram of an example flow chart of process conducted with the cardless payment system 100. The process conducted with the cardless payment system 100 involves relationships between a user's mobile device, a server system, and a merchant's device. The server system can reside in the payment service system 108 and be configured to send and receive communications between the user device and the merchant device. The server system can include the application server 110 and/or the secure server 112. The communications can be encrypted using secure protocols built into the user device, server system, and merchant device. In some implementations, this process is implemented through the applications installed on both the user's mobile device and the merchant's device.

In a typical situation, the user enters a request into the mobile device 102 to identify a merchant that will perform cardless payment transactions. The mobile device 102 directs the request to the server system. The request can be accompanied by location information, e.g., as determined by the mobile device 102. The server system receives the request, and selects one or more merchants based on the location information from the customer and the stored location information for the merchant. At least an identification of the merchant and the location information for the merchant is sent to the mobile device 102.

The user may input a request for further information about a merchant, e.g., press a "details" button on the user interface of the user application. In response, the user device can display further information received from the merchant, e.g., the list of goods or services available, operating hours, and phone number.

The user sends an indication of consent to perform a cardless payment transaction with the merchant to the server system. For example, the user can request to "open a tab" at a merchant by interfacing with the user application on the user device (step 302); this request can constitute the indication of consent.

Alternatively, the request to identify a merchant, the display of information concerning the merchant, and/or the indication of consent, could be entered into a computer other than the user device 102, e.g., the user's home computer, that is logged in to the user's account on the payment service system 108. In any event, should the user indicate consent to perform the transaction, at least an identification of the merchant and the location information for the merchant is sent to the mobile device 102.

The mobile device determines whether it is within the predetermined distance from the merchant (step 304). In some implementations, if the mobile device does not have the current location of the merchant, or if the merchant updated its location information, the merchant location can be pushed or pulled into the mobile device. Alternatively, if the user opts in to sharing of location information, the location information of the mobile device can be provided to the server of the payment service system 108, and the server determines the distance between the merchant and the mobile device.

As described above, if the mobile device determines the user's mobile device is not within a predetermined distance (e.g. 500 feet), the mobile device displays a message indicating its inability to open a tab and rejecting the user's request (step 308). In this case, the mobile device can create or configure a tab, but cannot open a tab. In other words, the merchant cannot charge the user's financial account using a cardless payment transaction until the user is within the predetermined distance and the merchant has the user's consent. This is further described in FIG. 6.

On the other hand, if the mobile device is within the predetermined distance, the mobile device sends an indication of proximity to the server of the payment service system (step 306). In some implementations, the user can "auto-open" a tab. For example, the user first requests that a tab be "auto-opened." While a tab is configured to be "auto-opened", the mobile device can automatically detect when it is within the predetermined distance and send the indication of proximity, which will be described further in FIG. 5. The indication of proximity can be determined using wireless network geo-fencing or GPS signals. In some implementations, if the mobile device is not within the predetermined distance, the user application will not permit the indication of consent to be input. In some implementations, if the mobile device is not within the predetermined distance when an indication of consent is input, the user application will require that the user again input an indication of consent when the mobile device is within the predetermined distance.

After the server receives this indication of proximity, the server system sends the indication of the mobile device's presence and personal identifying information to the merchant device (step 310). In some implementations, personal identifying information includes the user's name and picture. Upon receipt of this information, the merchant device displays a tab (step 312) and the user's identifying information (step 314) on the graphical user interface (GUI) of the merchant application. In some implementations, through the GUI of the merchant application, the merchant can select items that the user has sought to purchase. The application can be configured to associate individual prices with each of the merchant's items, and the application can automatically sum the total transaction amount that the user owes. In some implementations, the merchant can enter into the application a total sum of prices for all the items the user wishes to purchase, as well as tax or tip. A user can authorize payment for a tab by verbally notifying the merchant. For example, a user named John Smith can tell the merchant, "Put this on John Smith." Before or after the user authorizes payment for the tab, the merchant verifies the user's identity (step 316). In some implementations, the merchant ensures the image displayed on the merchant device matches the user who is present in person. Assuming that the image matches, the merchant selects the user's tab using the GUI of the merchant application. In some implementations, the merchant can ask the user for more identifying information before processing the transaction such as the user's birthday, address, or other personal identifying information. After verifying the user's identity, the merchant interfaces with the merchant application to start processing the transaction.

In some implementations, the amount to be charged exceeds a predetermined amount set by the user, the merchant or the cardless payment processor. In this case, the user enters in a PIN associated with the user's account into the merchant device. The merchant device verifies the PIN with the server. Alternatively, the server system may communicate with the user device and cause the user device to requested that the user enter the PIN into the user device. In yet another alternative, the server system can ask the user to confirm the payment on the user device, removing the need to enter a PIN.

The merchant's device sends a record of the requested transaction to the server (step 318). The server system continues processing the requested transaction (step 320) by sending the record to the computer system of the card payment network 116, e.g., Visa or MasterCard, and the card payment network 116 then sends the record to the card issuer, e.g., the bank, as described above.

If the transaction fails because it would exceed the credit limit or there are insufficient funds in the financial account, the server notifies the merchant application. In some implementations, the server can notify both the merchant application and user application.

If the transaction succeeds and the server system receives approval from the card payment network 116, the server system communicates this to the merchant device. The merchant device then captures the transaction. In the capture stage, the approved transaction is again routed from the merchant to the credit card processor, card network and card issuer. The record of the transaction in the capture stage can be the cardholder's signature (if appropriate), or other information. The capture state can trigger the financial transaction between the card issuer and the merchant. On receipt of an indication from the card network that the transaction has been captured, the server system optionally creates receipts to send to the user, e.g., through the user application and/or through the previously provided contact email, and to the merchant (step 322). Both devices then display the receipt in each of their applications (steps 324, 326). Optionally, the user may be permitted to opt out of notification.

Figure 4:
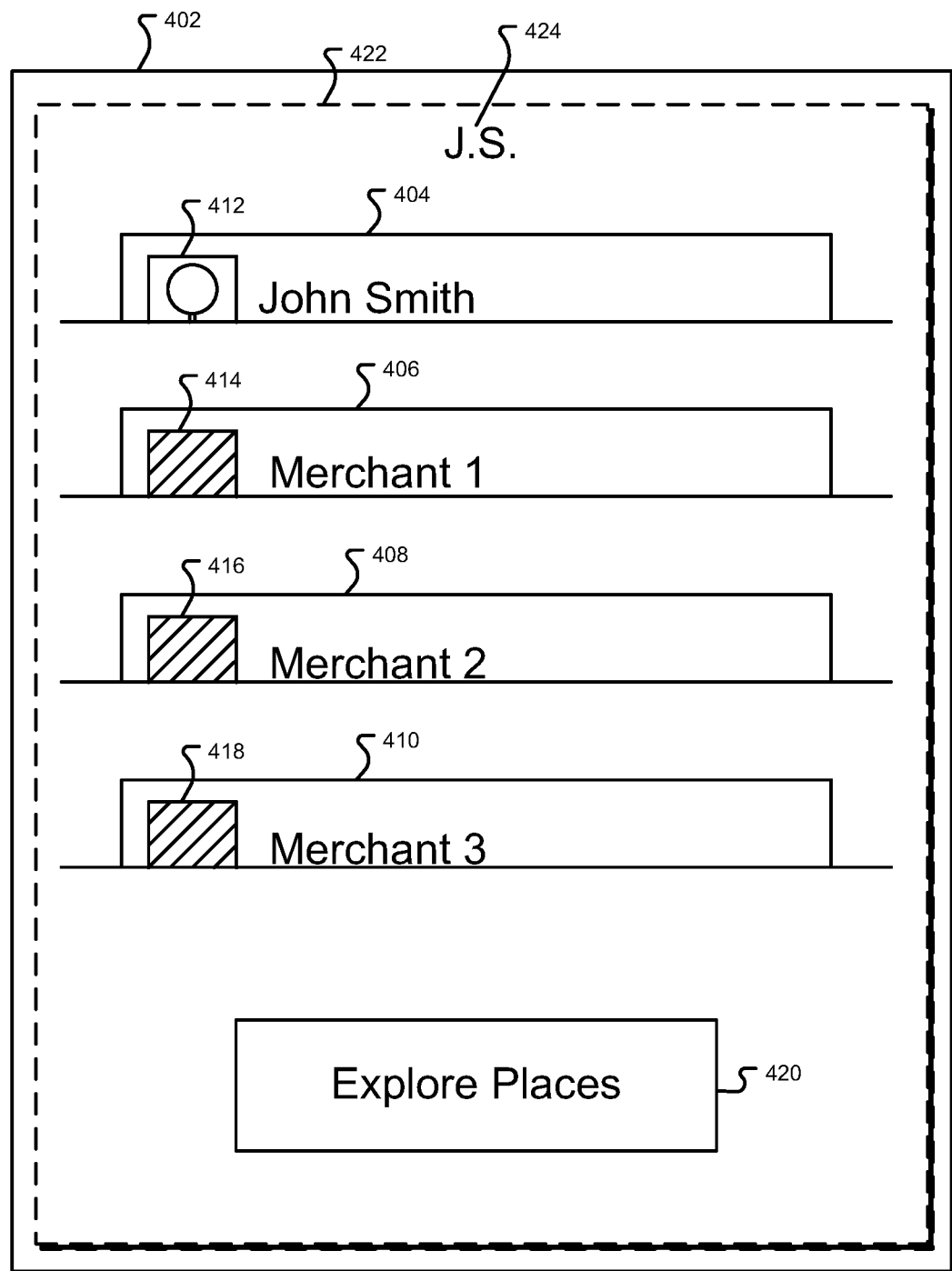
FIG. 4 is a diagram of an example view of the application's main page on the user's mobile device.

FIG. 4 is a diagram of an example view of the application's main page on the user's mobile device 402. In some implementations, each entity (e.g. user or merchant) is represented as a card and relationships between the user and user-selected merchants are represented as cards stored in a card case 422. The card case 422 can display the user's initials 424. The edges of the card case 422 can be a dashed line to mimic stitching of a wallet. Each card can contain a picture representing a logo or a profile picture 412, 414, 416, 418. For example, a user named John Smith can access his user account information by tapping the John Smith card 404. Each merchant can be represented with a custom-designed card. In some implementations, tapping the card of Merchant 1 406, Merchant 2 108, or Merchant 3 410 will cause the mobile device 402 to display an option to either "Open a tab" or "Show details" regarding the merchant. In some implementations, directing the user device to open a tab will follow the process of FIG. 3. In some implementations, showing more details will display a custom merchant page indicating information regarding the merchant. For example, the mobile device can display a map around the merchant's area, the merchant's phone number, the merchant's operating hours, or other merchant information. The application also allows the user to "Explore Places" 420. In some implementations, this opens a list of nearby or featured merchants that are associated with the cardless payment system. A user then has an option to add one of the merchants in the list to the "card case" view of the user's application.

FIG. 5 is a diagram of an example application view 504 of a user that has opened a tab at a merchant inside the predetermined distance from the merchant. This view can show the name of the merchant or the merchant's logo 506. In some implementations, because the user's credit card is already in the cardless payment system, the user does not need to physically give a credit card to the merchant. For example, once a user named John Smith wants to checkout with a few items, John Smith can pay by verbally telling a cashier "Put it on John Smith" 508. The cashier can verify John's identity as described above. A user can also press a "Cancel Payment" button 510 to close the tab for the merchant. Closing the tab will prevent the merchant and the merchant's device from charging the user using a cardless payment transaction. In some implementations, merchants can also close the tab on the merchant device; information that the tab is closed is transmitted to the server system and then to the mobile device, causing the tab (if being displayed) to close on the mobile device as well. In some implementations, tabs automatically close after a transaction has been approved. In some implementations, tabs automatically close after a preset amount of time, e.g., if no transaction has occurred. In some implementations, a tab can be auto-opened 512. If this is turned on, the user has given consent to open a tab automatically whenever the user's mobile device is within the predetermined distance from the merchant. The mobile device then can automatically detect in the background when it is within the predetermined distance and automatically sends, also in the background, an indication of proximity to a server in the payment service system as described above. The user can choose to engage in a cardless payment transaction with the merchant without ever bringing the application to the foreground. Therefore, in some implementations, this removes the need to run the application on a main thread of the device's processor. In other words, the user does not need to start the application when inside the predetermined distance and tap "Open a tab". In practice, with Auto Open Tab turned on, John Smith, holding his mobile device 502, can walk to a merchant from outside the predetermined distance, order an item for sale, and pay using the cardless payment system without interfacing with his mobile device 502 at the point of sale. In some implementations, the cardless payment system can limit the "auto-open" functionality to merchants with a fixed location for security reasons.

Figure 6:
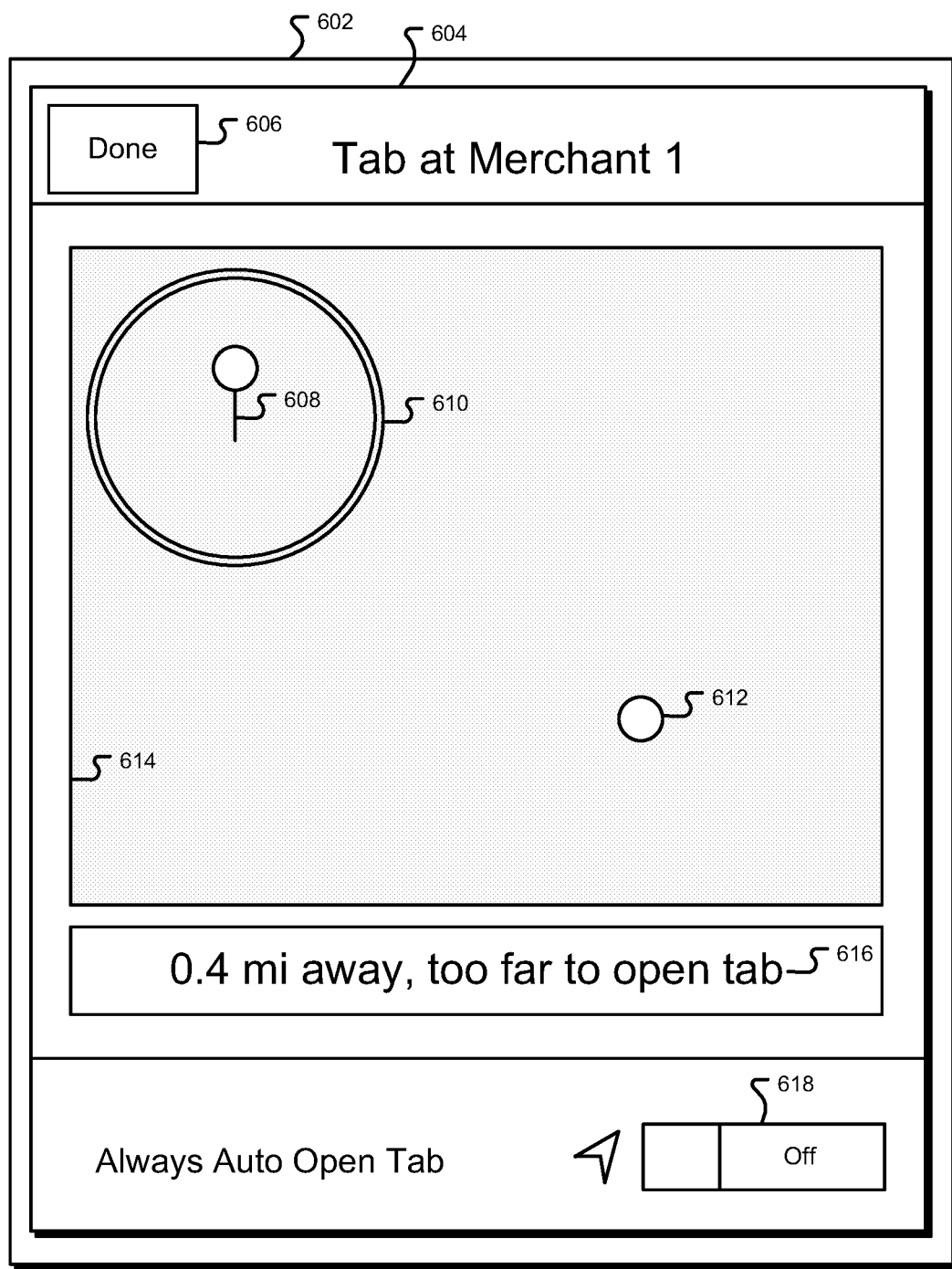
FIG. 6 is a diagram of an example application view with a user that has attempted to open a tab at a merchant outside the predetermined distance from the merchant.

FIG. 6 is a diagram 600 of an example application view 604 with a user that has attempted to open a tab at a merchant outside the predetermined distance from the merchant 610. In some implementations, the view shows a map 614 of the user's current location 612 and the location of the merchant 608 with a predetermined distance surrounding the merchant 610. In some implementations, the device can provide directions from the user's location 612 to the merchant's location 608. The device can also calculate or display how far away the user's current location 612 is from the merchant's location 608. For example, the text can read "0.4 mi away, too far to open tab" 616. In this case, because the user's mobile device 602 is outside the predetermined distance from the merchant, the user and the merchant cannot engage in a cardless payment transaction. Pressing the Done button can close this view 606. In some implementations, this view of the application also allows the user to "Always Auto Open Tab" 618 as described above.

Figure 7:
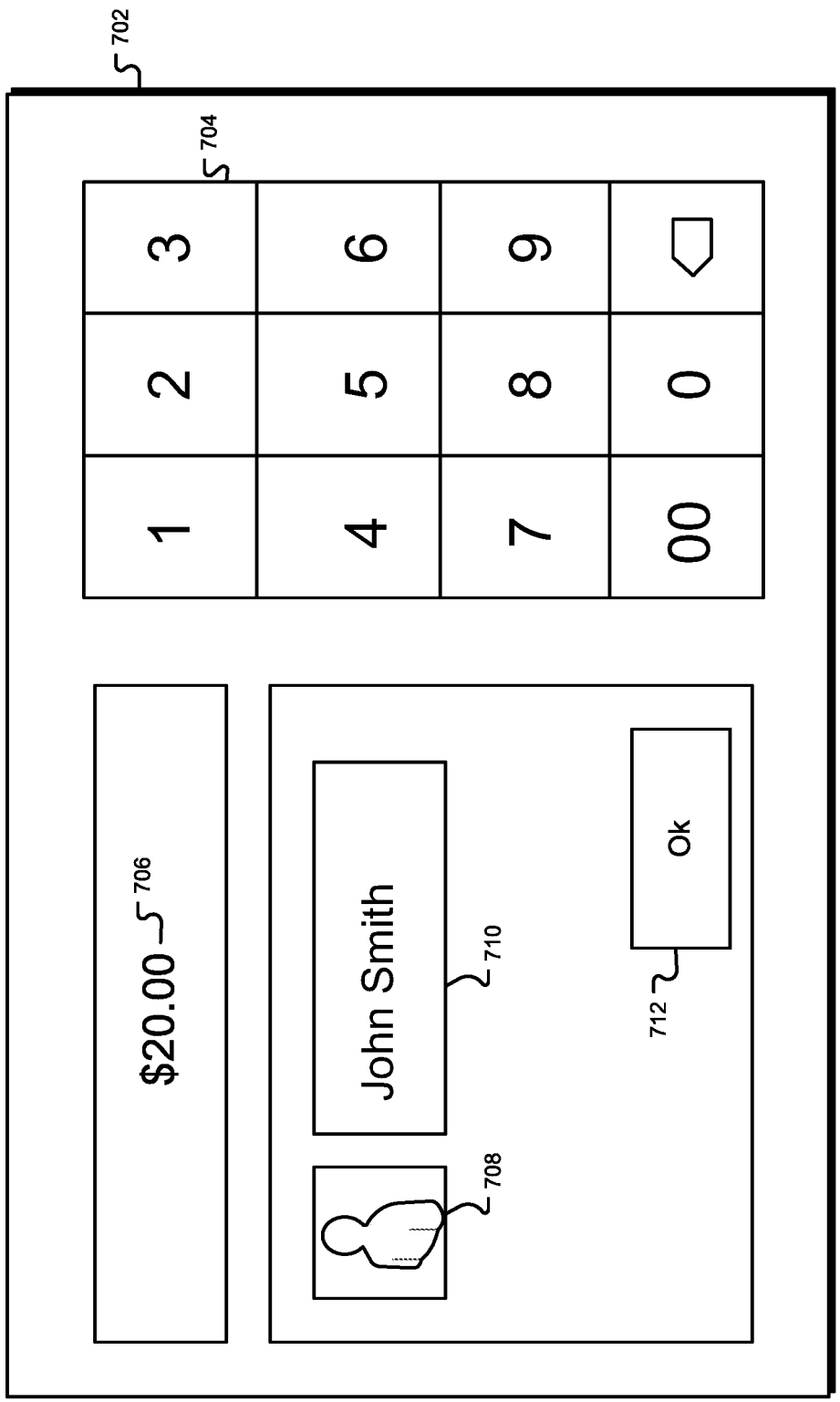
FIG. 7 is a diagram of an example view of a merchant device's application.

FIG. 7 is a diagram of an example view 700 of a merchant device's application 702. If a user is associated with the cardless payment system and is within the predetermined distance from the merchant, the device can display the user's identifying information in the application. In some implementations, the identifying information includes the user's name 710, picture 708, phone number, email address, or other personal identifying information. In some implementations, after verifying the user's identity using the identifying information, the merchant enters in a tab 706 into the application using the keypad 704, shows the user the amount to be charged, and taps the "Ok" button 712 to cause the device to process the transaction.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of proximity-based interfacing, the method comprising:
   identifying, by a computing system, that a first user and a second user are both registered with a transaction service;
   receiving, by the computing system, location data for a first user device associated with the first user and a second user device associated with the second user, the location data including a first geographic location of a first user device and a second geographic location of a second user device, wherein the first geographic location is based on a first positioning receiver of the first user device, and wherein the second geographic location is based on a second positioning receiver of the second user device;
   determining, by the computing system, that at a first time, the first geographic location of the first user device is within a first predetermined distance of the second geographic location of the second user device but outside of a second predetermined distance of the second geographic location of the second user device;
   generating, by the computing system and for at least the first user device, a map user interface that shows the first geographic location of the first user device and the second geographic location of the second user device in response to the determining that the first geographic location of the first user device is within the first predetermined distance of the second geographic location of the second user device at the first time;
   receiving, by the computing system at a second time, at least one update to the location data, wherein the at least one update includes a change to at least one of the first geographic location of the first user device or the second geographic location of the second user device, wherein the second time is after the first time;
   determining, by the computing system and based on the at least one update, that at the second time, the first geographic location of the first user device is within the second predetermined distance of the second geographic location of the second user device; and
   automatically facilitating, by the computing system, a transaction between the first user device and the second user device through the transaction service in response to the determining that the first geographic location of the first user device is within the second predetermined distance of the second geographic location of the second user device at the second time.

2. The method of claim 1, wherein the first user device is associated with a customer, and wherein the second user device is associated with a merchant.

3. The method of claim 1, wherein the first user device is associated with a merchant, and wherein the second user device is associated with a customer.

4. The method of claim 1, further comprising:
   generating, for at least the first user device, at least one update to the map user interface based on the at least one update to the location data.

5. A method of proximity-based interfacing, the method comprising:
   receiving, at a computing system, location data for a first user device associated with a first user and a second user device associated with a second user, the location data including a first geographic location of a first user device and a second geographic location of a second user device, wherein the first geographic location is based on a first positioning receiver of the first user device, and wherein the second geographic location is based on a second positioning receiver of the second user device;
   determining, by the computing system, that at a first time, the first geographic location of the first user device is within a first predetermined distance of the second geographic location of the second user device but outside of a second predetermined distance of the second geographic location of the second user device;
   generating, by the computing system and for at least the first user device, a map user interface that indicates the first geographic location of the first user device and the second geographic location of the second user device in response to the determining that the first geographic location of the first user device is within the first predetermined distance of the second geographic location of the second user device at the first time;
   receiving, by the computing system at a second time, at least one update to the location data, wherein the at least one update includes a change to at least one of the first geographic location of the first user device or the second geographic location of the second user device, wherein the second time is after the first time;
   determining, by the computing system and based on the at least one update, that at the second time the first geographic location of the first user device is within the second predetermined distance of the second geographic location of the second user device; and
   automatically facilitating, by the computing system, a transaction between the first user device and the second user device in response to the determining that the first geographic location of the first user device is within the second predetermined distance of the second geographic location of the second user device at the second time.

6. The method of claim 5, wherein the map user interface includes a map that shows the first geographic location and the second geographic location.

7. The method of claim 5, wherein the map user interface includes directions for traveling between the first geographic location and the second geographic location.

8. The method of claim 5, further comprising:
   identifying that the first user and the second user are both registered with a transaction service, wherein automatically facilitating the transaction includes automatically facilitating the transaction using the transaction service.

9. The method of claim 5, wherein the first user device is associated with a customer, and wherein the second user device is associated with a merchant.

10. The method of claim 5, wherein the first user device is associated with a merchant, and wherein the second user device is associated with a customer.

11. The method of claim 5, further comprising:
    generating, for at least the first user device, at least one update to the map user interface based on the at least one update to the location data.

12. The method of claim 5, wherein the at least one update to the location data includes an update to the first geographic location.

13. The method of claim 5, wherein the at least one update to the location data includes an update to the second geographic location.

14. The method of claim 5, further comprising:
    receiving payment instrument information read from a payment instrument using a payment instrument reader; and storing the payment instrument information, wherein automatically facilitating the transaction includes automatically facilitating the transaction using the payment instrument information as stored.

15. The method of claim 14, wherein the receiving of the payment instrument information is associated with a previous transaction, the previous transaction having been processed before the transaction.

16. The method of claim 5, wherein the first positioning receiver is a first global positioning system (GPS) receiver, and wherein the second positioning receiver is a second GPS receiver.

17. The method of claim 5, wherein at least one of the first positioning receiver or the second positioning receiver is associated with at least one wireless network.

18. The method of claim 5, wherein the at least one update to the location data indicates at least one movement of at least one of the first user device or the second user device.

19. The method of claim 5, wherein automatically facilitating the transaction between the first user device and the second user device includes automatically facilitating transfer of data between a first account associated with the first user and a second account associated with the second user.

20. A system comprising:
at least one memory; and
at least one processor, wherein execution of instructions stored in the at least one memory by the at least one processor causes the at least one processor to:
receive location data for a first user device associated with a first user and a second user device associated with a second user, the location data including a first geographic location of a first user device and a second geographic location of a second user device, wherein the first geographic location is based on a first positioning receiver of the first user device, and wherein the second geographic location is based on a second positioning receiver of the second user device;
determine that, at a first time, the first geographic location of the first user device is within a first predetermined distance of the second geographic location of the second user device but outside of a second predetermined distance of the second geographic location of the second user device;
generate, for at least the first user device, a map user interface representation that indicates the first geographic location of the first user device and the second geographic location of the second user device in response to the determining that the first geographic location of the first user device is within the first predetermined distance of the second geographic location of the second user device at the first time;
receive, at a second time, at least one update to the location data, wherein the at least one update includes a change to at least one of the first geographic location of the first user device or the second geographic location of the second user device, wherein the second time is after the first time;
determine, based on the at least one update, that at the second time, the first geographic location of the first user device is within the second predetermined distance of the second geographic location of the second user device; and
automatically facilitate a transaction between the first user device and the second user device in response to the determining that the first geographic location of the first user device is within the second predetermined distance of the second geographic location of the second user device at the second time.

* * * * *